US010084833B2

(12) United States Patent
McDonnell et al.

(10) Patent No.: US 10,084,833 B2
(45) Date of Patent: Sep. 25, 2018

(54) INITIATING A COLLABORATION SESSION BETWEEN DEVICES USING AN AUDIBLE MESSAGE

(71) Applicant: Cisco Technology, Inc., San Jose, CA (US)

(72) Inventors: Niall L. McDonnell, Knocknacarra (IE); Liam Frawley, Oranmore (IE); Martin B. Feeney, Kilcolgan (IE)

(73) Assignee: Cisco Technology, Inc., San Jose, CA (US)

( * ) Notice: Subject to any disclaimer, the term of this patent is extended or adjusted under 35 U.S.C. 154(b) by 324 days.

(21) Appl. No.: 14/935,571

(22) Filed: Nov. 9, 2015

(65) Prior Publication Data

US 2017/0134456 A1    May 11, 2017

(51) Int. Cl.
*H04L 12/18* (2006.01)
*H04L 29/06* (2006.01)
*H04L 5/00* (2006.01)
*H04L 29/08* (2006.01)

(52) U.S. Cl.
CPC ........ *H04L 65/4076* (2013.01); *H04L 5/0055* (2013.01); *H04L 12/1895* (2013.01); *H04L 65/1069* (2013.01); *H04L 65/403* (2013.01); *H04L 67/10* (2013.01)

(58) Field of Classification Search
CPC ........................ H04L 65/403–65/4076; H04L 65/1069–65/1073; H04L 12/18–12/1895; G06Q 10/06; G06Q 10/10
See application file for complete search history.

(56) References Cited

U.S. PATENT DOCUMENTS

| 2005/0243894 A1* | 11/2005 | Chen ................. | H02M 1/44 375/139 |
| 2009/0077045 A1* | 3/2009 | Kirchmeier ............ | G06Q 10/06 |
| 2010/0110837 A1* | 5/2010 | Jung ..................... | H04B 11/00 367/137 |

(Continued)

OTHER PUBLICATIONS

Schellenberg et al, "Frequency ratios and the perception of tone patterns" published in Psychonomic Bulletin & Review in 1994.*

(Continued)

*Primary Examiner* — Wing F Chan
*Assistant Examiner* — Raji Krishnan
(74) *Attorney, Agent, or Firm* — Baker Botts L.L.P.

(57) ABSTRACT

In one embodiment, a network interface broadcasts an audible message from a first computing device to a plurality of second computing devices over a first channel. The audible message comprises an audible noise broadcasted using a plurality of frequencies and a first unique identifier indicative of the first computing device. The network interface receives an acknowledgment message from each of the plurality of second computing devices over a second channel. A processor identifies each of the plurality of second computing devices based on the second unique identifier in the acknowledgment message and initiates a collaboration session between the first computing device and the plurality of second computing devices by sending a collaboration message from the first computing device to the plurality of second computing devices. The collaboration message automatically causes the plurality of second computing devices to enter the collaboration session.

20 Claims, 2 Drawing Sheets

(56) References Cited

U.S. PATENT DOCUMENTS

| | | |
|---|---|---|
| 2011/0179182 A1 | 7/2011 | Vadla Ravnäs |
| 2012/0263019 A1 | 10/2012 | Armstong-Muntner |
| 2014/0143434 A1* | 5/2014 | Sanche .................. H04L 67/26 709/228 |

OTHER PUBLICATIONS

"Avaya Notification System" published online, dated 2012.*
"CUCM Integration with Cisco Paging Server/InformaCast Configuration Example" dated Jan. 16, 2014.*

* cited by examiner

INITIATING A COLLABORATION SESSION BETWEEN DEVICES USING AN AUDIBLE MESSAGE

TECHNICAL FIELD

This disclosure relates generally to collaboration sessions, and more particularly to initiating a collaboration session between devices using an audible message.

BACKGROUND

A leader of a meeting may want other attendees of the meeting to join a collaboration session. Generally, the process of starting a collaboration session requires both the leader and the attendees to perform several actions. As a result, the process of starting a collaboration session is cumbersome and time consuming as attendees cannot automatically join a collaboration session.

BRIEF DESCRIPTION OF THE DRAWINGS

For a more complete understanding of the present disclosure and for further features and advantages thereof, reference is now made to the following description taken in conjunction with the accompanying drawings, in which.

DESCRIPTION OF EXAMPLE EMBODIMENTS

Overview

Figure 1:
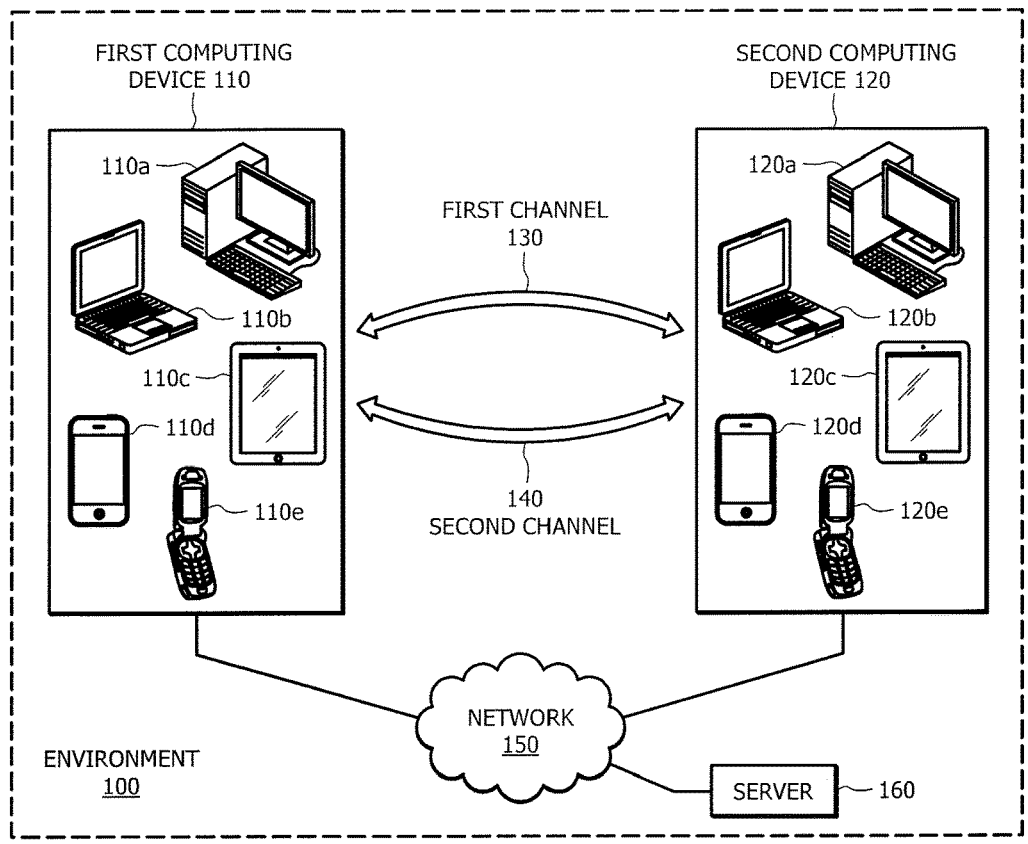
FIG. 1 is a diagram illustrating an example environment in which a collaboration session may be initiated, according to certain embodiments of the present disclosure.

In accordance with one embodiment of the present disclosure, a network interface broadcasts an audible message from a first computing device to a plurality of second computing devices over a first channel. The audible message comprises an audible noise broadcasted using a plurality of frequencies and a first unique identifier indicative of the first computing device. The network interface receives an acknowledgment message from each of the plurality of second computing devices over a second channel. Each acknowledgment message comprises a second unique identifier indicative of one of the plurality of second computing devices. The second channel is distinct from the first channel. A processor, communicatively coupled to the network interface, identifies each of the plurality of second computing devices based on the second unique identifier in the acknowledgment message. The processor initiates a collaboration session between the first computing device and the plurality of computing devices by causing the network interface to transmit a collaboration message from the first computing device to the plurality of second computing devices. The collaboration message automatically causes the plurality of second computing devices to enter the collaboration session.

EXAMPLE EMBODIMENTS

Embodiments of the present disclosure and its advantages are best understood by referring to FIGS. 1-4, like numerals being used for like and corresponding parts of the various drawings.

As users become more connected, users of devices may want to initiate or join a collaboration session between devices. For example, a meeting leader way want to share its desktop with attendees of the meeting. However, the meeting leader's device may have to send several messages over a network to set up the collaboration session, and the attendees may have to locate the messages in an e-mail inbox and click several buttons to join the collaboration session. As a result, starting a collaboration session is a cumbersome and time-consuming process, which results in reduced efficiency and increased costs for businesses.

The teachings of this disclosure recognize that it is desirable to provide a system that automatically initiates a collaboration session between devices by using an audible message to pair devices in the same room. The teachings of this disclosure additionally recognize that it is desirable to broadcast a second audible noise with a first audible noise to provide a pleasing user experience.

Certain embodiments of the present disclosure may provide one or more technical advantages. For example, one embodiment automatically causes users in a room to join a collaboration session, which reduces the amount of time and user-involvement in joining the collaboration session (e.g., the user does not have to locate an invitation in an inbox, click on the invitation, and click through multiple other options to enter a collaboration session). As another example, one embodiment uses audible pairing to pair devices in the same room, which limits access to the collaboration session to only devices in that room. As yet another example, one embodiment broadcasts a second audible noise when it broadcasts the audible message, which provides a better user experience. As yet another example, one embodiment uses a multi-tone modulation method, which precludes devices outside the room from receiving the audible message broadcasted within the room. As yet another example, one embodiment applies a linear increase or decrease in frequency at each frequency at which the audible message is broadcasted, which provides a smoother user experience.

Other technical advantages of the present disclosure will be readily apparent to one skilled in the art from the following figures, descriptions, and claims. Moreover, while specific advantages have been enumerated above, various embodiments may include all, some, or none of the enumerated advantages.

Figure 2:
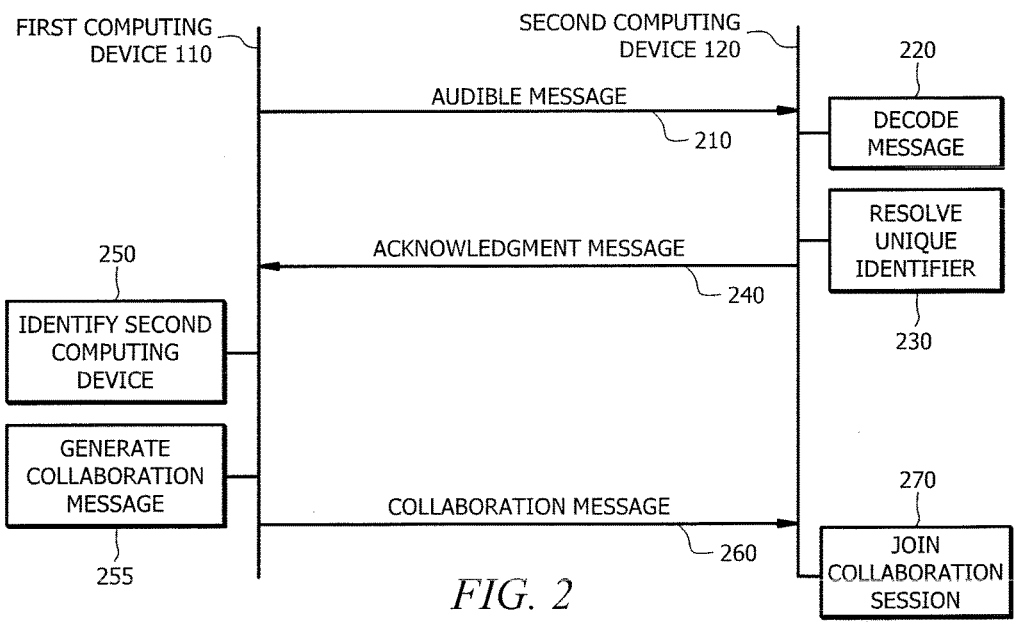
FIG. 2 is a signal flow diagram illustrating an example flow of messages during initiation of a collaboration session, according to certain embodiments of the present disclosure.
Figure 3:
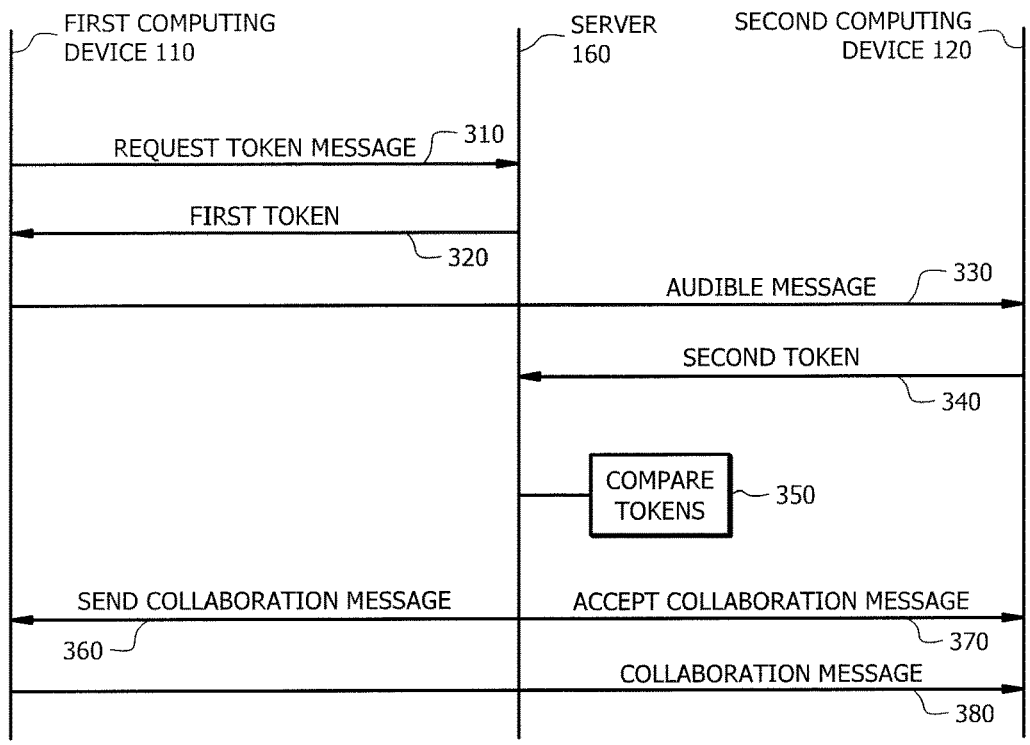
FIG. 3 is a signal flow diagram illustrating an example flow of messages during initiation of a collaboration session using a server, according to certain embodiments of the present disclosure.
Figure 4:
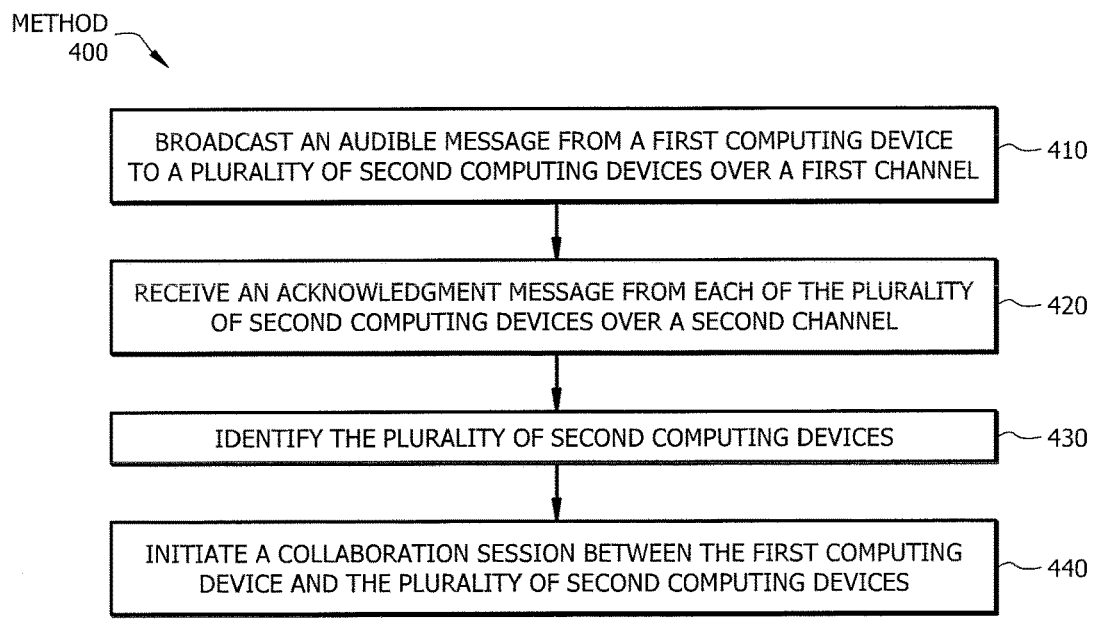
FIG. 4 is a flow chart illustrating an example method for initiating a collaboration session between devices using audible pairing, according to certain embodiments of the present disclosure.

Additional details are discussed with respect to FIGS. 1 through 4. FIG. 1 illustrates an example environment 100 in which a collaboration session may be initiated. FIGS. 2 and 3 illustrate the flow of various messages in initiating a collaboration session. FIG. 4 is a flow chart illustrating an example method 400 of initiating a collaboration session between devices using audible pairing.

FIG. 1 is a diagram illustrating an example environment 100 in which a collaboration session may be initiated, according to certain embodiments of the present disclosure. Environment 100 may be any environment in which first computing device 110 initiates a collaboration session with second computing device 120 using an audible message. Environment 100 may be an enclosed room in certain embodiments. For example, environment 100 may be a classroom. As another example, environment 100 may be a conference room. As yet another example, environment 100 may be an office. Environment 100 may include first computing device 110, second computing device 120, first channel 130, second channel 140, network 150, and server 160 in certain embodiments.

First computing device 110 may be any computing device configured to initiate a collaboration session with second computing device 120 using audible pairing in certain embodiments. For example, first computing device 110 may be a desktop computer 110a, laptop computer 110b, tablet 110c, smartphone 110d, cellphone 110e, a video-conferencing end point, or any other device (wireless or wired) that can initiate a collaboration session using audible pairing. First computing device 110 may communicate with second computing device 120 over first channel 130, second channel 140, and/or network 150 in certain embodiments. For example, first computing device 110 may broadcast an audible message to second computing device 120 over first channel 130. As another example, first computing device 110 may send a collaboration message to second computing device 120 over second channel 140 or network 150. First computing device 110 may communicate with server 160 over network 150 in certain embodiments. For example, first computing device 110 may send a message requesting a token to server 160 over network 150. As another example, first computing device 110 may receive a first token from server 160 over network 150. As noted throughout this disclosure, first computing device 110 may initiate a collaboration session with second computing device 120.

Second computing device 120 may be any computing device configured to automatically join a collaboration session with first computing device 110 through audible pairing in certain embodiments. For example, second computing device 120 may be a desktop computer 120a, laptop computer 120b, tablet 120c, smartphone 120d, cellphone 120e, a video-conferencing end point, or any other device (wireless or wired) that can join a collaboration session using audible pairing. Second computing device 120 may be configured to prompt a user to join a collaboration session in some embodiments. For example, after receiving a collaboration message from first computing device 110, second computing device 120 may display a prompt to join a collaboration session (e.g., "Accept" or "Decline"). Second computing device 120 may communicate with first computing device 110 over first channel 130, second channel 140, and/or network 150 in certain embodiments. For example, second computing device 120 may receive a broadcasted audible message from first computing device 110 over network 150. As another example, second computing device 120 may send an acknowledgment message to first computing device 110 over second channel 140 or network 150. Second computing device 120 may communicate with server 160 over network 150 in certain embodiments. For example, second computing device 120 may send a token to server 160 over network 150. As another example, second computing device 120 may receive a message instructing second computing device 120 to accept an invitation to join a collaboration session from server 160 over network 150. Although discussed and illustrated as a single second computing device 120, second computing device 120 may be a plurality of computing devices.

First channel 130 may be a communication path over which an audible message may be broadcasted from first computing device 110 to second computing device 120 in certain embodiments. First channel 130 may be distinct from second channel 140 in certain embodiments. For example, first channel 130 may be a frequency at which a user may hear an audible message, and second channel 140 may be a frequency used in a wireless network. As another example, first channel 130 may be an audible channels, while second channel 140 may be a channel within network 150 (e.g., a wireless network or a cellular network).

Second channel 140 may be a communication path over which an acknowledgment message or collaboration message may be sent in certain embodiments. For example, second channel 140 may be a communication path over a wired or wireless internet protocol network in some embodiments. As another example, second channel 140 may be a Bluetooth® communications channel. As noted above, second channel 140 may be distinct from first channel 130 in an embodiment. Although second channel 140 is illustrated in FIG. 1 separately from network 150, second channel 140 may be part of network 150 in some embodiments.

Network 150 may be any network that facilitates communication of messages between the components of environment 100. Network 150 may include any interconnecting system capable of transmitting audio, video, signals, data, messages, or any combination of the preceding. Network 150 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Server 160 may be any component configured to compare tokens received from first computing device 110 and second computing device 120, instruct first computing device 110 to send a collaboration message to second computing device 120, and instruct second computing device 120 to accept an invitation to join a collaboration session in an embodiment. Server 160 may include a network server, any suitable remote server, a mainframe, a host computer, a workstation, a web server, a personal computer, a file server, or any other suitable device operable to compare tokens and initiate communications between first computing device 110 and second computing device 120. In some embodiments, server 160 may execute any suitable operating system, including future operating systems. The functions of server 160 may be performed by any suitable combination of one or more servers or other components at one or more locations. Server 160 may be a private server in an embodiment. Server 160 may be a virtual or physical server in some embodiments. Server 160 may include one or more servers at the same or remote locations.

As an example embodiment of operation, first computing device 110 and second computing device 120 may be in environment 100, such as a room. A user of first computing device 110 may want to share the user's display on first computing device 110 with another user using second computing device 120. First computing device 110 may broadcast an audible message over first channel 130 to all other computing devices in the room, such as second computing device 120. Second computing device 120 may receive the audible message using, for example, a microphone of second computing device 120. Second computing device 120 may then decode the audible message, resolve the unique identifier of first computing device 110, and send an acknowledgment message to first computing device 110 over second channel 140. First computing device 110 may identify second computing device 120 using the acknowledgment message. First computing device 110 may generate and send a collaboration message to second computing device 120, which causes second computing device 120 to automatically show the display of first computing device 110. As a result of automatically joining the collaboration session using audible pairing, significant time is saved because users do not have to click through multiple menus to set up a collaboration session.

A component of environment 100 may include an interface, logic, memory, and other suitable elements. An interface may receive input, send output, process the input and/or output, and perform other suitable operations. An interface may comprise hardware and/or software. Logic, when executed by a processor, may perform and/or manage the operation of the component. Logic may include hardware, software, and other logic. Logic may be encoded in one or more non-transitory, tangible media, such as a computer-readable medium or any other suitable tangible medium.

Modifications, additions, or omissions may be made to environment 100 without departing from the scope of the disclosure. For example, environment 100 may include multiple second computing devices 120, networks 150, or servers 160.

FIG. 2 is a signal flow diagram illustrating an example flow of messages during initiation of a collaboration session, according to certain embodiments of the present disclosure. The signal flow begins at step 210, where first computing device 110 broadcasts an audible message to second computing device 120 in an embodiment. First computing device 110 may broadcast the audible message using a network interface of first computing device 110 in an embodiment. The audible message may include an audible noise in an embodiment. For example, first computing device 110 may encode the audible message, modulate a plurality of frequencies with the encoded message, and play the encoded message as an audible noise within environment 110. The audible message may be encoded with error detection and/or correction techniques in some embodiments. For example, the audible message may include a cyclic redundancy check. Although the audible message is described as broadcasted to second computing device 120, any computing device in environment 100 (such as where environment 100 includes a plurality of second computing devices 120) may receive the broadcasted audible message and perform the steps described with respect to FIG. 2.

The audible message may be broadcasted using a plurality of frequencies in some embodiments. For example, the audible message may be broadcasted using sixteen frequencies. The audible message may be broadcasted at each of the plurality of frequencies for a predetermined period of time. For example, the audible message may be broadcasted over sixteen frequencies, each frequency broadcasted for 116 milliseconds. When an audible message is broadcasted, each of the frequencies may include a first portion that linearly increases or linearly decreases from a baseline frequency to a transmission frequency in some embodiments. For example, the first frequency over which the audible message is broadcasted may start at a baseline frequency (e.g., 3273 Hertz) and linearly increase until it reaches the transmission frequency. At the end of the duration of the audible message for that first frequency and during the first portion of the second frequency over which the audible message is broadcasted, the frequency may linearly decrease from the transmission frequency (now the baseline frequency) to the second transmission frequency. The baseline frequency may be the lowest available transmission frequency in some embodiments. For example, if the lowest available transmission frequency is 3273 Hertz, then the baseline frequency may be 3273 Hertz. The baseline frequency may be the previous transmission frequency in some embodiments. For example, if the last frequency over which the audible message is broadcasted is 4700 Hertz, then the baseline frequency may be 4700 Hertz. In some embodiments, the first portion may be the first ten percent of the duration of a frequency burst. In certain embodiments, the baseline frequency may be distinct from the transmission frequency. In some embodiments, the amplitude (i.e., volume) may change linearly or non-linearly from zero to the full volume at the start of the transmission and from full volume to zero at the end of the transmission. As a result of linearly increasing and decreasing the frequency, the present disclosure may provide users with a more pleasant listening experience rather than sharp spikes in noise.

Although examples of linearly increasing or decreasing the frequency are provided above, certain embodiments may include non-linear increases or decreases in frequency. Non-linear frequency changes may include sinusoidal, logarithmic, quadratic, and exponential changes. As an example, the frequency may exponentially decrease from the first frequency at which the audible message was broadcasted until it reaches the second frequency at which the audible message will be broadcasted. In that example, the exponential decrease may occur during a first portion (e.g., the first ten percent of the time for the frequency burst) of the second frequency burst.

The audible message may be broadcasted over any range of frequencies in an embodiment. For example, the audible message may be broadcasted over a range of frequencies between 3200 and 6000 hertz. As another example, the audible message may be broadcasted over a range of frequencies between 3273 and 6025 hertz. Those example ranges broadcast the audible message in a frequency range above the speech spectrum, but below the 7500 hertz low-pass filter cut off of receivers on some computing devices. As a result of broadcasting the audible message above 3200 hertz, the audible noise may not escape environment 100 such that devices outside of environment 100 are unable to join the collaboration session. Additionally, as a result of broadcasting the audible noise below 7500 hertz, the audible noise may not be rejected by a low-pass filter on second computing device 120.

The audible message may include a first unique identifier indicative of first computing device 110 in an embodiment. The first unique identifier may include any identifier of first computing device 110. For example, the first unique identifier may include a telephone number of first computing device 110. As another example, the first unique identifier may be an internet protocol address of first computing device 110. As yet another example, the first unique identifier may be an e-mail address of first computing device 110. In some embodiments, server 160 may assign the first unique identifier to first computing device 110.

First computing device 110 may also broadcast a second audible noise with the audible message in some embodiments. Second audible noise may be any noise that provides a smooth listening experience for users in an embodiment. For example, the second audible noise may be a frequency-rich sound, such as a short musical sound. First computing device 110 may broadcast second audible noise simultaneously with the audible message in an embodiment. The second audible noise may be broadcasted over one or more frequencies distinct from a frequency at which the audible message is broadcasted in an embodiment. For example, the second audible noise may be broadcasted over a range of frequencies except those reserved for the audible message. In that example, if the audible message has a reserved band of frequencies between 3200 Hertz and 6000 Hertz, then the second audible noise have signal energy at frequencies below 3200 Hertz and above 6000 Hertz. The second audible noise may be broadcasted outside of the frequency range of the audible message in an embodiment. For example, the second audible noise may be broadcasted below 3200 hertz and/or above 6000 hertz when the audible message is broadcasted between 3200 and 6000 hertz. As a result of broadcasting the second audible noise at a distinct frequency and/or frequency range, the user's listening experience is smoother while not interfering with reception of the audible message.

At step 220, second computing device 120 decodes the audible message. Second computing device 120 may decode the audible message using any suitable technique. In some embodiments, second computing device 120 may decode the audible message by performing a Fast Fourier Transform (FFT) technique at predetermined intervals of time per frequency burst. For example, second computing device 120 may perform an FFT every 11.6 milliseconds for a single frequency burst. Second computing device 120 may perform the FFT a predetermined number of times per frequency burst. For example, second computing device 120 may perform ten FFTs for a single frequency burst.

As noted in step 210, the audible message may be broadcasted over a plurality of frequencies. Second computing device 120 may store data indicative of a signal strength at each of the plurality of frequencies. For example, when an audible message is broadcasted using sixteen frequencies and an FFT is performed ten times per frequency burst, second computing device 120 may store data indicative of the signal strength at each of the frequencies for each of the ten FFTs. Second computing device 120 may compare the data indicative of the signal strength for each of the FFTs, and determine the frequencies with the strongest signal strength. For example, for the first FFT across each of the frequencies, second computing device 120 may determine that the first frequency has the strongest signal strength. Data indicative of a signal strength at each of the plurality of frequencies may be stored in any manner. For example, second computing device 120 may store the data in a circular ring buffer. In some embodiments, second computing device 120 may store N frequencies with the strongest signal strength. For example, when an audible message is broadcasted over twelve frequencies, second computing device 120 may store the six frequencies with the strongest signal strength. Second computing device 120 may store N frequencies that have a signal strength greater than ten times the average signal strength of other frequencies used to broadcast the audible message in an embodiment. Second computing device 120 may use the stored frequencies for error detection and/or correction in some embodiments. For example, where the broadcasted signal carrying the audible message contains spikes of noise, second computing device 120 may retry the cyclic redundancy check across the N frequencies with the highest signal strength.

At step 230, second computing device 120 may resolve the first unique identifier received in the audible message from first computing device 110 in an embodiment. Resolving the first unique identifier may allow second computing device 120 to communicate back with first computing device 110 in certain embodiments. Second computing device 120 may resolve the first unique identifier in various ways depending on the type of first unique identifier. For example, if the first unique identifier is a telephone number, second computing device 120 may look up the number in a corporate directory to determine the identity of first computing device 110. As another example, if the first unique identifier is a telephone number but second computing device 120 does not have access to a corporate directory, second computing device 120 may access an application to look up the telephone number and determine the identity of first computing device 110. Second computing device 120 may communicate with first computing device 110 using the first unique identifier in an embodiment. For example, if the first unique identifier is an internet protocol address and port number, second computing device 120 may use that information to communicate with first computing device 110. In other embodiments, second computing device 120 may associate the first unique identifier with another identifier of first computing device 110, such as an Extensible Messaging and Presence Protocol (XMPP) identifier, that allows second computing device 120 to communicate back with first computing device 110 in an embodiment. Second computing device 120 may access a service or application on server 160 to determine the association between the first unique identifier and another identifier of first computing device 110 in certain embodiments.

At step 240, second computing device 120 sends an acknowledgement message to first computing device 110 in an embodiment. The acknowledgment message may allow first computing device 110 to identify second computing device 120 so that first computing device 110 can initiate a collaboration session with second computing device 120. The acknowledgment message may be formatted according to any message formatting process. For example, the acknowledgment message may be an XMPP message. The acknowledgment message may include a unique identifier indicative of second computing device 120 in an embodiment. The unique identifier may be any type of identifier of second computing device 120. For example, the unique identifier may include a phone number of second computing device 120. As another example, the unique identifier may include an e-mail address of second computing device 120. As yet another example, the unique identifier may include an internet protocol address and/or port number of second computing device 120. The acknowledgement message may be sent over second channel 140 in an embodiment. For example, second computing device 120 may send the acknowledgment message to first computing device 110 over a frequency distinct from the frequency used for first channel 130. As another example, second computing device 120 may send the acknowledgment message to first computing device 110 through network 150.

At step 250, first computing device 110 may identify second computing device 120 using the acknowledgement message received from second computing device 120 in an embodiment. First computing device 110 may identify second computing device 120 using a processor in an embodiment. First computing device 110 may identify second computing device 120 using the unique identifier of second computing device 120 included in the acknowledgment message in an embodiment. For example, first computing device 110 may use second computing device 120's telephone number included in the acknowledgment message to identify second computing device 120. As another example, first computing device 110 may use second computing device 120's e-mail address included in the acknowledgment message to identify second computing device 120.

First computing device 110 may identify second computing device 120 in any manner. For example, first computing device 110 may use the unique identifier to look up second computing device 120's identity in a database. As another example, first computing device 110 may use the unique identifier in an application that identifies second computing device 120. As yet another example, first computing device 110 may identify second computing device 120 from the unique identifier itself.

At step 255, first computing device 110 may generate a collaboration message in an embodiment. First computing device 110 may generate the collaboration message using a processor in an embodiment. The collaboration message may instruct second computing device 120 to automatically join the collaboration session in certain embodiments. For example, the collaboration message may cause second computing device 120 to automatically accept an invitation to a desktop share session. As another example, the collaboration message may cause second computing device 120 to automatically join a conference call (e.g., a telephone conference). As another example, the collaboration message may cause second computing device 120 to automatically join an electronic whiteboard session. As another example, the collaboration message may cause second computing device 120 to automatically join a group chat session. As yet another example, the collaboration message may cause second computing device 120 to automatically join a videoconference. In some embodiments, the collaboration message may cause second computing device 120 to display a prompt to join a collaboration session. For example, the collaboration message may cause second computing device 120 to display buttons (e.g., "Accept" or "Decline") that allow second computing device 120 to enter or refuse to enter a collaboration session.

At step 260, first computing device 110 may send a collaboration message to second computing device 120 in an embodiment. First computing device 110 may send the collaboration message to second computing device 120 using a network interface of first computing device 110 in an embodiment. First computing device 110 may send the collaboration message over second channel 140 in an embodiment. First computing device 110 may send the collaboration message through network 150 in some embodiments.

At step 270, second computing device 120 may join a collaboration session with first computing device 110 in an embodiment. In some embodiments, second computing device 120 automatically joins the collaboration session after receiving a collaboration message from first computing device 110. In other embodiments, second computing device 120 may join a collaboration session after displaying a prompt to join a collaboration session and receiving a user input on the prompt indicating that the user wishes to join the collaboration session. Although second computing device 120 is discussed as a single computing device, second computing device 120 may include a plurality of computing devices.

As an example embodiment of operation, first computing device 110 may broadcast an audible message over first channel 130. The audible message may include a unique identifier indicative of first computing device 110. Second computing device 120 may receive the broadcasted audible message. Second computing device 120 may decode the audible message and perform error detection and correction. Second computing device 120 may resolve the unique identifier of first computing device 110 so that second computing device 120 can communicate back with first computing device 110. Second computing device 120 may send an acknowledgment message to first computing device 110 over second channel 140. The acknowledgment message may include a unique identifier of second computing device 120 so that first computing device 110 can identify second computing device 120 for additional communications (e.g., sending the collaboration message). First computing device 110 may identify second computing device 120 using the unique identifier included in the acknowledgment message. First computing device 110 may then generate and send a collaboration message to each second computing device 120 from which it received an acknowledgment message over second channel 140 (or network 150). Upon reception of the collaboration message, second computing device 120 may automatically join a collaboration session with first computing device 110. As a result of using the audible message to pair first computing device 110 and second computing device 120, significant time is saved is setting up a collaboration session as users do not have to click through several menus.

Modifications, additions, or omissions may be made to the signal flow process of FIG. 2 without departing from the scope of the disclosure. For example, first computing device 110 may generate a list of each second computing device 120 that acknowledges the broadcasted audible message. First computing device 110 may compare the list against authorized second computing devices 120, eliminate any unauthorized computing devices from the list, and send a collaboration message to each authorized second computing device 120 on the list.

FIG. 3 is a signal flow diagram illustrating an example flow of messages during initiation of a collaboration session using server 160, according to certain embodiments of the present disclosure. The signal flow begins at step 310, where first computing device 110 sends a message requesting a token to server 160 in an embodiment. First computing device 110 may send a message requesting a token to server 160 over network 150 in an embodiment. First computing device 110 may send the message requesting a token prior to broadcasting an audible message in certain embodiments. The message requesting a token may include a unique identifier of first computing device 110 in an embodiment. The unique identifier included in the message requesting a token may be any identifier of first computing device 110. For example, the unique identifier may be first computing device 110's telephone number. As another example, the unique identifier may be an e-mail address associated with first computing device 110. As yet another example, the identifier may be an internet protocol address associated with first computing device 110.

At step 320, server 160 may send a first token to first computing device 110 over network 150 in an embodiment. The first token may be any identifier that server 160 associates with first computing device 110 in an embodiment. For example, the first token may be a random number. As another example, the first token may be a keyword. As yet another example, the first token may be a random series of letters and/or numbers. Server 160 may store the first token and associate the first token with first computing device 110. As discussed below, once server 160 receives a second token referencing the first token from second computing device 120, server 160 may initiate the collaboration session. Although second computing device 120 is discussed as a single computing device, second computing device 120 may include a plurality of computing devices.

At step 330, first computing device 110 may broadcast an audible message to second computing device 120 over first channel 130 in an embodiment. First computing device 110 may broadcast the audible message in the same manner as described above with respect to FIG. 2. The audible message may include the first token in an embodiment. The audible message may be a reference to or indication of the first token in an embodiment. Although not illustrated in FIG. 3, second computing device 120 may receive and decode the audible message as described above with respect to FIG. 2.

At step 340, second computing device 120 may send a second token to server 160 after receiving the first token from first computing device 110 in an embodiment. The second token may include an identifier of second computing device 120 in some embodiments. For example, the identifier may be second computing device 120's telephone number. As another example, the identifier may be an e-mail address associated with second computing device 120. As yet another example, the identifier may be an internet protocol address associated with second computing device 120. The second token may include the first token in some embodiments. The second token may include a hash of the first token in certain embodiments. Second computing device 120 may send the second token to server 160 over network 150 in some embodiments.

At step 350, server 160 may compare the first token and the second token in an embodiment. In an embodiment, server 160 may compare the data in the second token with the data in the first token. For example, server 160 may compare a telephone number in the second token to a telephone number in the first token. If the second token has data that matches data in the first token, server 160 may initiate a collaboration session between first computing device 110 and second computing device 120 in an embodiment. Server 160 may determine if either token has expired in some embodiments. For example, server 160 may compare time stamps of either or both tokens to determine if a predetermined period of time has elapsed. If a token has expired, then server 160 may not cause first computing device 110 and second computing device 120 to enter a collaboration session in an embodiment.

At step 360, server 160 instructs first computing device 110 to send a collaboration message to second computing device 120 in an embodiment. Server 160 may send any type of message configured to instruct first computing device 110 to send the collaboration message in an embodiment. Server 160 may send a list of second computing devices 120 that have sent server 160 tokens in an embodiment. Server 160 may send the instruction to first computing device 110 over network 150 in an embodiment.

At step 370, server 160 instructs second computing device 120 to accept the invitation to join a collaboration session included in the collaboration message from first computing device 110 in an embodiment. In some embodiments, the instruction may cause second computing device 120 to automatically accept the invitation in the collaboration message from first computing device 110. In some embodiments, the instruction may cause second computing device 120 to display a prompt to join the collaboration session. Server 160 may send the instruction to second computing device 120 over network 150 in an embodiment.

At step 380, first computing device 110 initiates a collaboration session with second computing device 120 by sending a collaboration message to second computing device 120 in an embodiment. The collaboration message may be similar to the collaboration message described above with respect to FIG. 2. First computing device 110 may send the collaboration message over second channel 140 in an embodiment. First computing device 110 may send the collaboration message over network 150 in an embodiment. After receiving the collaboration message, second computing device 120 may automatically enter a collaboration session with first computing device 110 in an embodiment. In some embodiments, second computing device 120 may be prompted to enter a collaboration session (e.g., "Accept" or "Decline" options).

As an example embodiment of operation, first computing device 110 may send a message requesting a token to server 160. Server 160 may send a first token to first computing device 110. First computing device 110 may broadcast an audible message that includes the first token to second computing device 120 over first channel 130. Second computing device 120 may receive and decode the audible message. Second computing device 120 may send a second token to server 160. The second token may include the first token or an indication of the first token (e.g., a hash). Server 160 may compare the first token to the data received in the second token to determine if data in the second token matches data in the first token. If server 160 determines that the first computing device 110 and second computing device 120 are in proximity to each other (e.g., because it has received matching tokens), then server 160 instructs first computing device 110 to send a collaboration message and instructs second computing device 120 to accept the invitation to join a collaboration session. First computing device 110 may then send the collaboration message, and second computing device 120 may join the collaboration session with first computing device 110 after receiving the collaboration message.

Modifications, additions, or omissions may be made to the signal flow process of FIG. 3 without departing from the scope of the disclosure. For example, first computing device 110 may receive a list of each second computing device 120 that sent a second token to server 160. First computing device 110 may compare the list against authorized second computing devices 120, eliminate any unauthorized computing devices from the list, and send a collaboration message to each authorized second computing device 120 on the list.

FIG. 4 is a flow chart illustrating an example method 400 for initiating a collaboration session between devices using audible pairing, according to certain embodiments of the present disclosure. Method 400 begins at step 410, where an audible message is broadcasted from first computing device 110 to second computing device 120 over first channel 130 in an embodiment. The audible message may be broadcasted and include the same data as described with respect to FIG. 2.

At step 420, first computing device 110 receives an acknowledgement message from second computing device 120 over second channel 140 in an embodiment. The acknowledgment message may be the acknowledgment message described with respect to FIG. 2. Although second computing device 120 is discussed as a computing device, second computing device 120 may include a plurality of computing devices.

At step 430, first computing device 110 may identify second computing device 120 based on the second unique identifier in the received acknowledgement message in an embodiment. The second unique identifier may be any type of identifier of second computing device 120 as described with respect to FIG. 2.

At step 440, first computing device 110 initiates a collaboration session with second computing device 120 by sending a collaboration message to second computing device 120 in an embodiment. The collaboration message automatically causes second computing device 120 to enter the collaboration session in some embodiments. In certain embodiments, the collaboration message may cause second computing device 120 to display a prompt to enter a collaboration session.

Certain embodiments of the present disclosure may provide one or more technical advantages. For example, one embodiment automatically causes second computing device 120 to join a collaboration session, which reduces the amount of time and user-involvement in joining the collaboration session (e.g., the user of second computing device 120 does not have to locate an invitation in an inbox, click on the invitation, and click through multiple other options to enter a collaboration session). As another example, one embodiment uses audible pairing to pair first computing device 110 with second computing device 120 when those devices are in environment 100 (e.g., a room), which limits access to the collaboration session to only devices in environment 100. As yet another example, one embodiment broadcasts a second audible noise when it broadcasts the audible message, which provides a better user experience. As yet another example, one embodiment uses a multi-tone modulation method, which precludes devices outside of environment 100 (e.g., a room) from receiving the audible message broadcasted within environment 100. As yet another example, one embodiment applies a linear increase or decrease in frequency to each frequency at which the audible message is broadcasted, which provides a smoother user experience.

Other technical advantages of the present disclosure will be readily apparent to one skilled in the art from the figures, descriptions, and claims. Moreover, while specific advantages have been enumerated above, various embodiments may include all, some, or none of the enumerated advantages.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A first computing device comprising a processor, a memory, and a network interface, the first computing device operable to:
broadcast an audible message from the first computing device over a first channel, wherein the audible message comprises an audible noise broadcasted using a plurality of frequencies and the audible message comprises a first unique identifier indicative of the first computing device, wherein the audible message is received by a plurality of second computing devices that are within audible range from the first computing device, wherein the plurality of second computing devices extract the first unique identifier from the received audible message;
receive, at the first computing device, an electronic acknowledgment message from each of the plurality of second computing devices over a second channel, wherein each acknowledgment message comprises a second unique identifier indicative of one of the plurality of second computing devices and the second channel is distinct from the first channel, wherein the second channel comprises at least one frequency in a wireless network; and
identify, by the first computing device, each of the plurality of second computing devices based on the second unique identifier in the respective acknowledgment messages; and
initiate a collaboration session between the first computing device and the plurality of second computing devices by transmitting an electronic collaboration message from the first computing device to the plurality of second computing devices, wherein the collaboration message automatically causes the plurality of second computing devices to enter the collaboration session.

2. The first computing device of claim 1, wherein the collaboration session comprises at least one of:
a desktop share;
a videoconference;
an electronic whiteboard session;
a group chat session; and
a telephone conference.

3. The first computing device of claim 1, wherein the first unique identifier comprises a telephone number of the first computing device.

4. The first computing device of claim 1, wherein the first computing device is further operable to simultaneously broadcast a second audible noise with the audible message, the second audible noise broadcasted over one or more frequencies distinct from a frequency at which the audible message is broadcasted.

5. The first computing device of claim 1, wherein the audible message is broadcasted in a frequency range between 3200 Hertz and 6000 Hertz.

6. The first computing device of claim 1, wherein the collaboration message is transmitted over the second channel.

7. The first computing device of claim 1, wherein each of the plurality of frequencies comprises a first portion that linearly increases or decreases from a baseline frequency to a transmission frequency.

8. A method, comprising:
broadcasting an audible message from a first computing device over a first channel, wherein the audible message comprises an audible noise broadcasted using a plurality of frequencies and the audible message comprises a first unique identifier indicative of the first computing device, wherein the audible message is received by a plurality of second computing devices that are within audible range from the first computing device, wherein the plurality of second computing devices extract the first unique identifier from the received audible message;
receiving, at the first computing device, an electronic acknowledgment message from each of the plurality of second computing devices over a second channel, wherein each acknowledgment message comprises a second unique identifier indicative of one of the plurality of second computing devices and the second channel is distinct from the first channel, wherein the second channel comprises at least one frequency in a wireless network;
identifying, by the first computing device, each of the plurality of second computing devices based on the second unique identifier in the respective acknowledgment messages; and
initiating a collaboration session between the first computing device and the plurality of second computing devices by transmitting an electronic collaboration message from the first computing device to the plurality of second computing devices, wherein the collaboration message automatically causes the plurality of second computing devices to enter the collaboration session.

9. The method of claim 8, wherein the collaboration session comprises at least one of:
   a desktop share;
   a videoconference;
   an electronic whiteboard session;
   a group chat session; and
   a telephone conference.

10. The method of claim 8, wherein the first unique identifier comprises a telephone number of the first computing device.

11. The method of claim 8, further comprising simultaneously broadcasting a second audible noise with the audible message, the second audible noise broadcasted over one or more frequencies distinct from a frequency at which the audible message is broadcasted.

12. The method of claim 8, wherein the audible message is broadcasted in a frequency range between 3200 Hertz and 6000 Hertz.

13. The method of claim 8, wherein the collaboration message is sent over the second channel.

14. The method of claim 8, wherein each of the plurality of frequencies comprises a first portion that linearly increases or decreases from a baseline frequency to a transmission frequency.

15. A non-transitory computer readable medium comprising logic, the logic, when executed by a processor, operable to:
   broadcast an audible message from a first computing device over a first channel, wherein the audible message comprises an audible noise broadcasted using a plurality of frequencies and the audible message comprises a first unique identifier indicative of the first computing device, wherein the audible message is received by a plurality of second computing devices that are within audible range from the first computing device, wherein the plurality of second computing devices extract the first unique identifier from the received audible message;
   receive, at the first computing device, an electronic acknowledgment message from each of the plurality of second computing devices over a second channel, wherein each acknowledgment message comprises a second unique identifier indicative of one of the plurality of second computing devices and the second channel is distinct from the first channel, wherein the second channel comprises at least one frequency in a wireless network;
   identify, by the first computing device, each of the plurality of second computing devices based on the second unique identifier in the respective acknowledgment messages; and
   initiate a collaboration session between the first computing device and the plurality of second computing devices by transmitting an electronic collaboration message from the first computing device to the plurality of second computing devices, wherein the collaboration message automatically causes the plurality of second computing devices to enter the collaboration session.

16. The computer readable medium of claim 15, wherein the collaboration session comprises at least one of:
   a desktop share;
   a videoconference;
   an electronic whiteboard session;
   a group chat session; and
   a telephone conference.

17. The computer readable medium of claim 15, wherein the first unique identifier comprises a telephone number of the first computing device.

18. The computer readable medium of claim 15, wherein the logic is further operable to simultaneously broadcast a second audible noise with the audible message, the second audible noise broadcasted over one or more frequencies distinct from a frequency at which the audible message is broadcasted.

19. The computer readable medium of claim 15, wherein the collaboration message is sent over the second channel.

20. The computer readable medium of claim 15, wherein each of the plurality of frequencies comprises a first portion that linearly increases or decreases from a baseline frequency to a transmission frequency.

* * * * *